United States Patent
Xi et al.

(10) Patent No.: US 12,500,284 B2
(45) Date of Patent: Dec. 16, 2025

(54) PRISMATIC BATTERY CAN WITH A THERMALLY CONDUCTIVE INSERT

(71) Applicant: GM GLOBAL TECHNOLOGY OPERATIONS LLC, Detroit, MI (US)

(72) Inventors: Liang Xi, Northville, MI (US); Alexander M. Bilinski, Avoca, MI (US); Lei Wang, Rochester Hills, MI (US); Srikant Srinivasan, Novi, MI (US); SriLakshmi Katar, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 305 days.

(21) Appl. No.: 18/347,767

(22) Filed: Jul. 6, 2023

(65) Prior Publication Data

US 2025/0015384 A1    Jan. 9, 2025

(51) Int. Cl.
*H01M 10/653*    (2014.01)
*B60K 11/02*    (2006.01)
(Continued)

(52) U.S. Cl.
CPC .......... *H01M 10/653* (2015.04); *B60K 11/02* (2013.01); *B60L 50/64* (2019.02);
(Continued)

(58) Field of Classification Search
CPC .......... H01M 10/653; H01M 10/0431; H01M 10/0525; H01M 10/613; H01M 10/625;
(Continued)

(56) References Cited

U.S. PATENT DOCUMENTS

2003/0017384 A1* 1/2003 Marukawa .......... H01M 10/647
                                                    429/120
2007/0009792 A1* 1/2007 Cheon ................. H01M 50/538
                                                    429/211
(Continued)

FOREIGN PATENT DOCUMENTS

DE    102009046801 A1 *  5/2011  .......... H01M 50/112

OTHER PUBLICATIONS

DE-102009046801-A1—English Translation (Year: 2009).*

*Primary Examiner* — Scott A Reinbold
(74) *Attorney, Agent, or Firm* — Quinn IP Law

(57) ABSTRACT

A mechanical design of a rechargeable battery cell (e.g., a Lithium-ion battery) disposed inside of a prismatic can, for use in electric vehicles and other electric-powered devices. The improved design uses a thermally conductive insert to divide the battery cell into two adjacent volumes that each hold a pair of stacked layers of a battery cell. This thermally conductive insert conducts heat from the center of the battery cell during battery recharging to actively-cooled channels disposed in a pair of cooling manifolds that are disposed on two vertical sides of the battery cell. Alternatively, or additionally, an actively-cooled bottom cold plate can be used. The pair of stacked battery layers can each be wound in a "jelly-roll" geometric configuration. The thermally conductive insert may be made of aluminum, aluminum alloy, copper, or copper alloy, and combinations thereof.

19 Claims, 18 Drawing Sheets

SEC B-B

(51) Int. Cl.
| | |
|---|---|
| *B60L 50/64* | (2019.01) |
| *H01M 10/04* | (2006.01) |
| *H01M 10/0525* | (2010.01) |
| *H01M 10/613* | (2014.01) |
| *H01M 10/625* | (2014.01) |
| *H01M 10/647* | (2014.01) |
| *H01M 10/6556* | (2014.01) |
| *H01M 10/6568* | (2014.01) |
| *H01M 50/103* | (2021.01) |
| *H01M 50/209* | (2021.01) |

(52) U.S. Cl.
CPC ... *H01M 10/0431* (2013.01); *H01M 10/0525* (2013.01); *H01M 10/613* (2015.04); *H01M 10/625* (2015.04); *H01M 10/647* (2015.04); *H01M 10/6556* (2015.04); *H01M 10/6568* (2015.04); *H01M 50/103* (2021.01); *H01M 50/209* (2021.01); *H01M 2220/20* (2013.01)

(58) Field of Classification Search
CPC ........... H01M 10/647; H01M 10/6556; H01M 10/6568; H01M 50/103; H01M 50/209; H01M 2220/20; H01M 10/0587; H01M 10/6554; H01M 10/655; B60K 11/02; B60L 50/64; Y02E 60/10; Y02P 70/50
USPC ........................................................ 180/65
See application file for complete search history.

(56) References Cited

U.S. PATENT DOCUMENTS

2013/0122331 A1* 5/2013 McDonald ........ H01M 10/6568
429/50
2022/0158149 A1* 5/2022 Schwarzwalder .. H01M 10/617

* cited by examiner

SEC B-B

SEC C-C

PRISMATIC BATTERY CAN WITH A THERMALLY CONDUCTIVE INSERT

INTRODUCTION

The present disclosure relates generally to electrochemical devices. More specifically, aspects of this disclosure relate to Lithium-ion or Lithium-metal batteries with a thermally conductive insert for use in electric motor vehicles and other electric-powered devices, such as electric-powered airplanes.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, rechargeable battery cells, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles derive their power from sources other than the engine, HEV engines may be turned off, in whole or in part, while the vehicle is propelled by the electric motor(s).

High-voltage (HV) electrical systems govern the transfer of electricity between the traction motors and the rechargeable battery packs that supply the requisite power for operating many hybrid-electric and full-electric powertrains. To provide the power capacity and energy density needed to propel a vehicle at desired speeds for desired ranges, contemporary traction battery packs group multiple battery cells (e.g., 8-16+ cells/stack) into individual battery modules (e.g., 10-40+ modules/pack) that are electrically interconnected in series or parallel and mounted onto the vehicle chassis, e.g., by a battery pack housing or support tray. Located on a battery side of the HV electric system is a front-end DC-to-DC power converter that is electrically connected to the traction battery pack(s) to increase the supply of voltage to a main DC bus and a DC-to-AC power inverter module (PIM). A high-frequency bulk capacitor may be arranged across the positive and negative terminals of the main DC bus to provide electrical stability and store supplemental electrical energy. A dedicated Electronic Battery Control Module (EBCM), through collaborative operation with a Powertrain Control Module (PCM) and each motor's power electronics package, governs operation of the battery pack(s) and traction motor(s).

A battery array, such as a battery module, pack, etc., typically includes a plurality of battery cells in relatively close proximity to one another. Batteries may be broadly classified into primary and secondary batteries. Primary batteries, also referred to as disposable batteries, are intended to be used until depleted, after which they are simply replaced with new batteries. Secondary batteries, more commonly referred to as rechargeable batteries, employ specific chemistries permitting such batteries to be repeatedly recharged and reused, therefore offering economic, environmental, and ease-of-use benefits compared to disposable batteries.

Rechargeable batteries may be used to power such diverse items as toys, consumer electronics, motor vehicles, and airplanes. Particular chemistries of rechargeable batteries, such as lithium-ion cells, as well as external factors, may cause internal chemical reactions generating significant amounts of thermal energy. Such abnormal chemical reactions may cause more heat to be generated by the battery cell than is effectively withdrawn. Exposure of a battery cell to elevated temperatures over prolonged periods may cause the cell to experience a thermal runaway event. Accordingly, a thermal runaway propagation (TRP) event starting within an individual cell may lead to the heat spreading to adjacent cells in the battery array and cause the thermal runaway event to affect the entire battery pack and affect nearby temperature-sensitive components, such as controllers, sensors, battery terminals and connectors, etc.

The individual cells of a lithium-ion battery pack may generate a significant amount of heat during charge and discharge cycles. This cell-borne heat is produced primarily by exothermic chemical reactions and losses due to activation energy, chemical transport, and resistance to ionic migration. Within lithium-ion batteries, a series of exothermic and gas-generating reactions may take place as cell temperatures rise that may push the battery assembly towards an unstable state. Such thermal events, if left unchecked, may lead to a more accelerated heat-generating state called "thermal runaway" (TR) or "thermal runaway propagation" (TRP), a condition in which the battery system is unable to return the internal battery components to normal operating temperatures. Battery modules, comprising multiple battery cells, may be supported by an actively-cooled, bottom cold plate to control the temperatures during battery charging and discharging operations.

SUMMARY

The present disclosure teaches an improved mechanical design of a rechargeable battery cell (e.g., a Lithium-ion battery) for use in electric vehicles and other electric-powered devices. The improved design uses a thermally conductive insert to divide the battery cell into one or more adjacent volumes that hold the stacked layers of a battery cell. This thermally conductive insert conducts heat from the center of the battery cell during battery recharging to actively-cooled channels disposed in a pair of cooling manifolds that are disposed on opposite vertical sides of the battery cell, and/or to an actively-cooled bottom cold plate. The pair of stacked battery layers may each be wound in a "jelly-roll" geometry. The thermally conductive insert may be made of aluminum, aluminum alloy, copper, or copper alloy, and combinations thereof. The thermally conductive insert is about 1 mm thick.

In some embodiments, a prismatic battery includes a prismatic battery can having a vertical Z-direction oriented along a height of the prismatic battery can, and a horizontal Y-direction oriented along a width of the prismatic battery can. The battery can includes a thermally conductive insert disposed inside of the prismatic battery can. The thermally conductive insert defines a first empty volume disposed inside of the prismatic battery can that is located on the first side of the thermally conductive insert. The thermally conductive insert also defines a second empty volume disposed inside of the prismatic battery can that is located on the second side of the thermally conductive insert.

In some embodiments, the thermally conductive insert is disposed in a middle location of the prismatic battery can.

In some embodiments, the thermally conductive insert is made of a thermally conductive metal chosen from aluminum, aluminum alloy, copper, or copper alloy, and combinations thereof.

In some embodiments, the prismatic battery further includes: a first set of battery layers disposed inside of the first volume in the prismatic battery can; and a second set of battery layers disposed inside of the second volume in the prismatic battery can.

In some embodiments, the prismatic battery comprises a Lithium-ion battery.

In some embodiments, the first set of battery layers and the second set of battery layers are wound in a "jelly-roll" geometry.

In some embodiments, the thermally conductive insert has a thickness that ranges from about 0.2 mm to about 1.2 mm.

In some embodiments, the thermally conductive insert has a thickness that is equal to about 0.8 mm.

In some embodiments, the prismatic battery can includes a pair of outer can walls that are oriented parallel to a plane of the thermally conductive insert.

In some embodiments, the thermally conductive insert is oriented parallel to a plane defined by the vertical Z-direction and the horizontal Y-direction.

In some embodiments, the thermally conductive insert is welded to the prismatic battery can.

In some embodiments, the thermally conductive insert is extruded simultaneously along with extruding the prismatic battery can.

In some embodiments, the first set of battery layers and the second set of battery layers includes a negative current collector layer. An anode electrode layer is located adjacent to the negative current collector layer. A separator layer is located adjacent to the anode electrode layer. A cathode electrode layer is located adjacent to the separator layer and opposite the anode electrode layer. A a positive current collector layer is located adjacent to the cathode electrode layer.

In some embodiments, the prismatic battery includes a Lithium-ion battery. The negative current collector layer includes copper. The anode electrode layer includes a material chosen from: graphite, Lithium Titanate, Silicon/Carbon, or Tin/Cobalt alloy, or combinations thereof. The separator layer includes a micro-porous polyolefin polymer chosen from: micro-porous polyethylene (PE), micro-porous polypropylene (PP), or micro-porous polyethylene terephthalate (PET), and combinations thereof. The cathode electrode layer includes a compound chosen from: lithium-metal-oxides, $LiCoO_2$ (LCO), $LiMn_2O_4$ (LMO), $LiFePO_4$ (LFP), Nickel-Manganese-Cobalt oxides (NMC), or Nickel-Cobalt-Aluminum Oxide (NCA), and combinations thereof. The positive current collector layer includes aluminum.

In some embodiments, the prismatic battery further includes: a first electrode tab disposed on top of the first set of battery layer. A second electrode tab is located on top of the second set of battery layers. A current collector plate bridges across, and electrically connects to, the pair of first and second electrode tabs. An electrical terminal is located on top of the current collector plate. The current collector plate is welded to the first electrode tab. The current collector plate is welded to the second electrode tab. The electrical terminal is attached to, and electrically connected to, the current collector plate.

In some embodiments, a prismatic battery includes a prismatic battery can. The prismatic thermally conductive insert is located inside of the prismatic battery can. This insert defines a first volume disposed inside the prismatic battery can that is located on a first side of the thermally conductive insert. The insert also defines a second volume disposed inside the prismatic battery can that is located on a second side of the thermally conductive insert.

In some embodiments, the prismatic battery further includes a first cooling manifold, with a first plurality of cooling channels, that is thermally coupled to a first vertical side of the prismatic battery can. The prismatic battery also includes a second cooling manifold, with a second plurality of cooling channels, that is thermally coupled to an opposing, second vertical side of the prismatic battery can.

In some embodiments, the prismatic battery further includes an actively-cooled, bottom cold plate disposed underneath the prismatic battery can.

In some embodiments, the prismatic battery further includes a first electrode tab located on a first side of the prismatic battery can. A second electrode tab is located on a second side of the prismatic battery can; and the first side of the prismatic battery can is different than the second side of the prismatic battery can. No electrode tabs are located on the upper surface of the prismatic battery can.

In some embodiments, an electric motor vehicle includes: a vehicle body with a passenger compartment, a plurality of road wheels attached to the vehicle body, and a traction motor attached to the vehicle body and operable to drive one or more of the plurality of road wheels to thereby propel the electric motor vehicle. A traction battery pack is attached to the vehicle body and electrically connected to the traction motor. The traction battery pack includes a plurality of prismatic battery cells arranged in mutually parallel rows. The plurality of prismatic battery cells includes a prismatic battery can and a thermally conductive insert located inside of the prismatic battery can. The thermally conductive insert defines a first volume located inside of the prismatic battery can that is located on a first side of the thermally conductive insert. A second volume is located inside of the prismatic battery can, which is located on a second side of the thermally conductive insert. A first set of Lithium-ion battery layers is located inside of the first volume in the prismatic battery can. A second set of Lithium-ion battery layers is located inside of the second volume in the prismatic battery can.

In some embodiments, the thermally conductive insert is made of a thermally conductive metal chosen from aluminum, aluminum alloy, copper, or copper alloy, and combinations thereof.

In some embodiments, the prismatic battery can further includes a cooling manifold with a plurality of cooling channels that is thermally-coupled to a top surface of the prismatic battery can.

In some embodiments, the prismatic battery includes a sealed cooling enclosure with a coolant fluid inlet and a coolant fluid outlet that completely encloses the prismatic battery can. This provides immersion cooling of the prismatic battery.

The above Summary does not represent every embodiment or every aspect of the present disclosure. Rather, the foregoing Summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and sub-combinations of the elements and features presented above and below.

DETAILED DESCRIPTION

Figure 1:
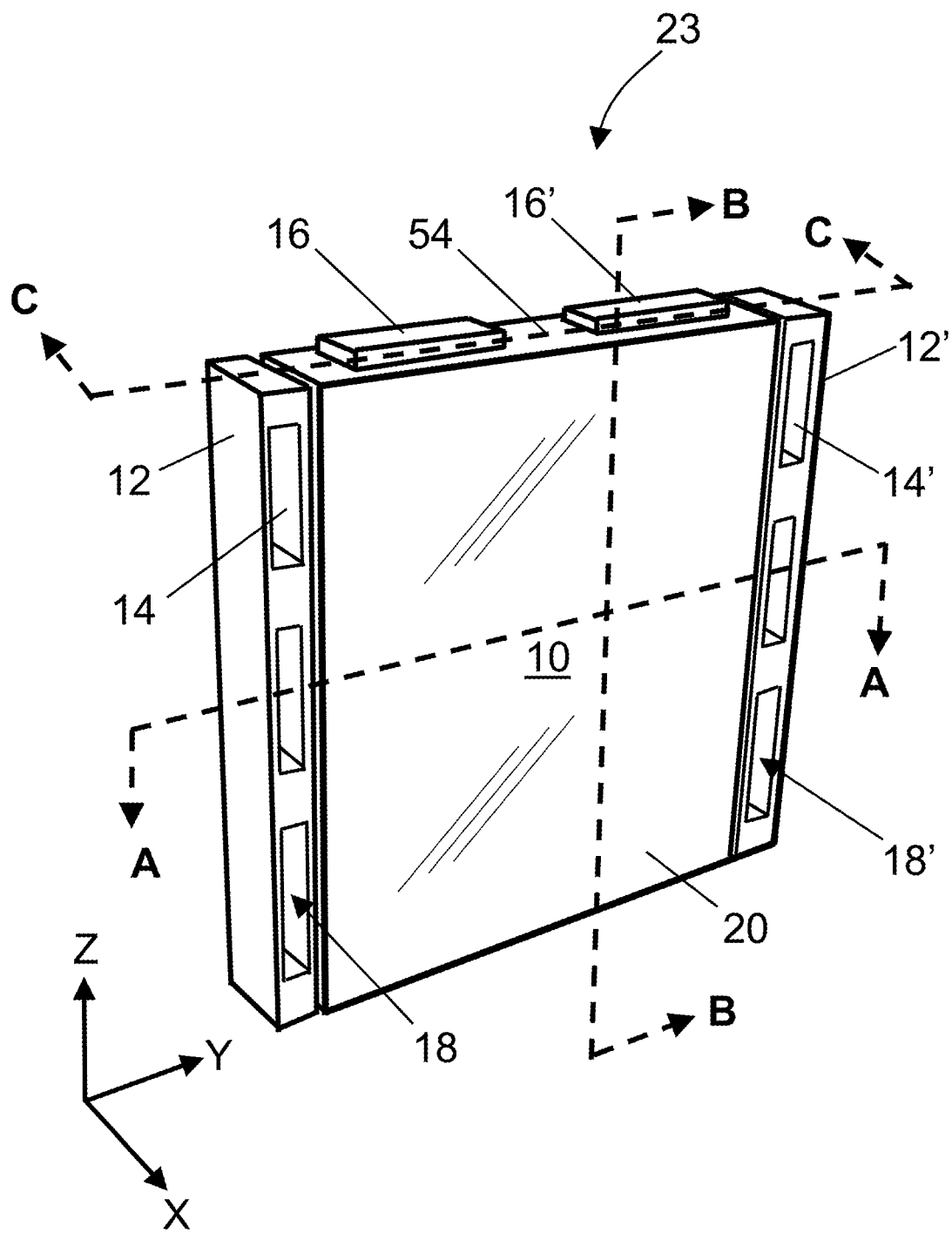
FIG. 1 shows a schematic perspective view of an example of a prismatic battery cell with active cooling channels disposed on each end of the battery cell, according to the present disclosure.

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference, or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface. The drawings are not drawn to scale, but, rather, are schematic drawings that illustrate the geometrical relationships between elements and objects.

The phrases "battery cell", "battery can", "battery housing", and "prismatic can" are used interchangeably. A "battery module" is defined as being two or more individual battery cells grouped together into a single battery module. A "battery pack" is defined as being two or more individual battery modules grouped together into a single battery pack. The phrase "battery module" or "battery pack" refers to a plurality of prismatic battery cans that are stacked side-by-side and arranged in a mutually parallel configuration inside of a battery module/pack. The words "insert", "layer" and "sheet" are used interchangeably, as it refers to a thermally conductive insert.

FIG. 1 shows a schematic perspective view of an example of a prismatic battery cell 10 with a plurality of active cooling channels 14, 14' disposed in cooling manifolds 12, 12' disposed on opposite sides of the battery can 21, according to the present disclosure. Battery cell 10 is housed inside of prismatic (i.e., rectangular) battery can 21, and has a pair of electrode terminals 16 and 16' on the top plate 54 of battery can 21. A pair of cooling manifolds 12 and 12' are disposed on either side of battery can 21, which have a plurality of cooling channels 14, 14', etc. that carry a coolant fluid 18, 18' flowing in the "X"-direction, respectively.

Figure 2:
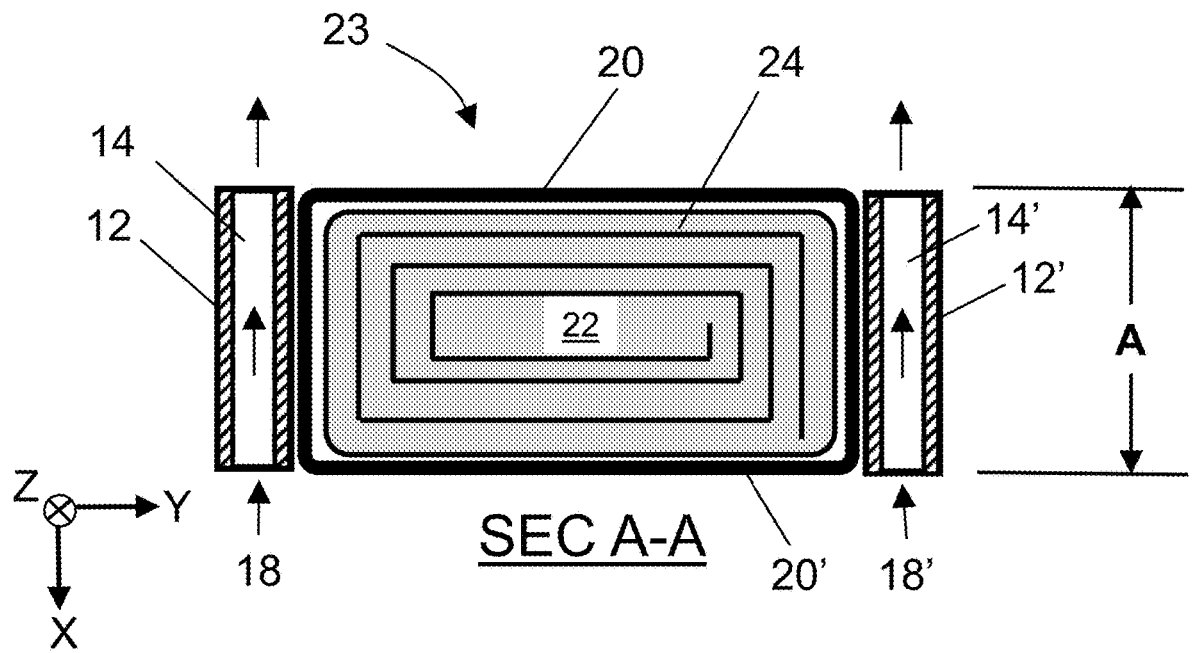
FIG. 2 shows a schematic cross-section view (SECTION A-A) of an example of a jelly-roll prismatic battery cell of width=A, with active cooling channels disposed on each end of the battery cell, according to the present disclosure.

FIG. 2 shows a schematic cross-section view (SEC A-A) of an example of a "jelly-roll" prismatic battery cell 22 of width=A (in the "X"-direction), with active cooling manifolds 12, 12' disposed on each end of the battery can 21 that contain coolant fluid 18, 18' flowing in coolant channels 14, 14', respectively, according to the present disclosure. Stacked (wound) battery layers 24 of battery cell 22 are wound in a jelly-roll geometry.

Figure 3:
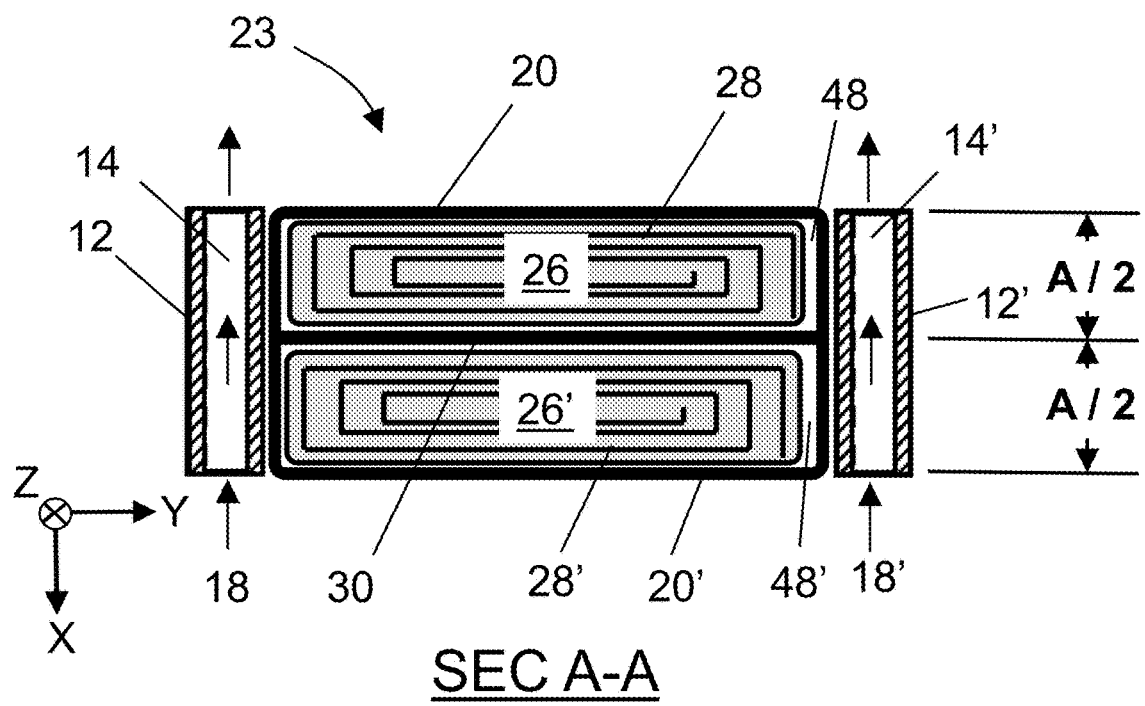
FIG. 3 shows a schematic cross-section view (SECTION A-A) of an example of two, half-sized jelly-roll prismatic battery cells of width=A/2, with active cooling channels disposed on each end of the battery cell, and a thermally conductive insert, according to the present disclosure.

FIG. 3 shows a schematic cross-section view (SEC A-A) of an example of two, half-sized, jelly-roll, prismatic battery cells 26, 26' of width=A/2 (in the "X"-direction), with active cooling channels 12, 12' disposed on proximal and distal vertical sides of battery cell 26, 26', respectively, and with a thermally conductive insert 30 disposed inside of battery can 23, according to the present disclosure. In some embodiments, thermally conductive insert 30 is disposed in a middle of battery can 23. Thermally conductive insert 30 is disposed inside of the prismatic battery can 23. Prismatic battery can 23 defines a first volume 48 that is disposed on a first side of the thermally conductive insert 30, and a second volume 48' that is disposed on a second side of the thermally conductive insert 30. Thermally conductive insert 30 conducts heat from the center of the battery can 23 out to the cooling channels 14, 14' in cooling manifold 12, 12'. Thermally conductive insert 30 may be made of an application-suitable material with a high thermal conductivity, including, for example: aluminum, aluminum alloy, copper, or copper alloy, and combinations thereof. In this embodiment, the Y-Z plane of thermally conductive insert 30 is oriented parallel to the Y-Z plane of battery can 23. Prismatic battery can 23 has a vertical Z-direction oriented along a height of the prismatic battery can 23, and a horizontal Y-direction oriented along a width of the prismatic battery can 23. Thermally conductive insert 30 has a broad plane that is oriented parallel to a plane defined by the vertical Z-direction and the horizontal Y-direction. Stacked battery layers 28 and 28' of battery cell 26 and 26', respectively, are wound in a "jelly-roll" geometrical configuration.

Figure 4:
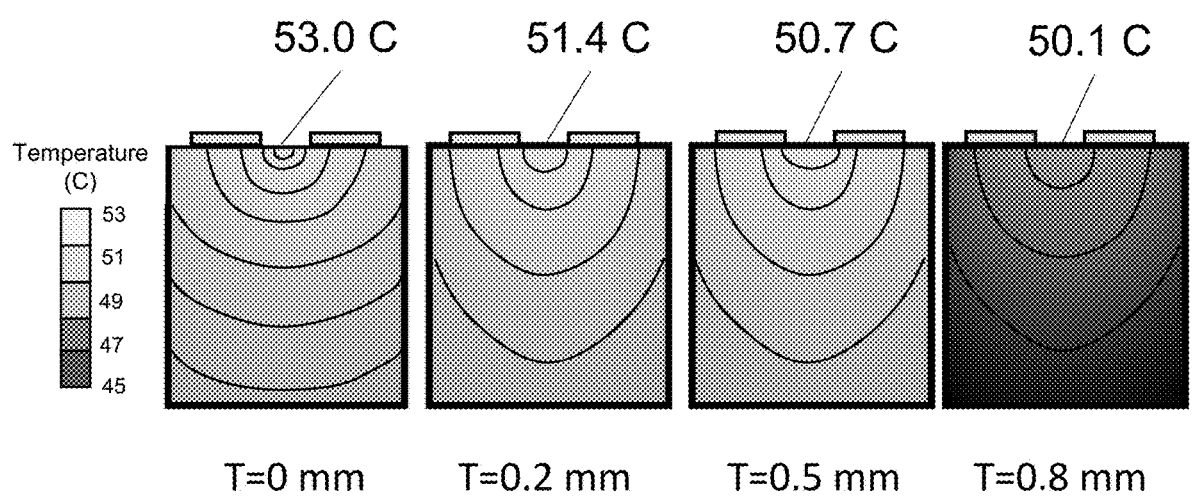
FIG. 4 shows a plot of an example of 2-D calculated temperature contours of a battery being recharged, at time=500 seconds, for four different battery designs, each with a different thickness, T, of a thermally conductive insert, according to the present disclosure.

FIG. 4 shows four examples of 2-D finite element calculated temperature contours of a Lithium-ion battery cell 10 being recharged, at time=500 seconds, for four different battery designs, each with a different thickness, T, of thermally conductive insert 30, according to the present disclosure. The thicker the thermally conductive insert 30 is (which is made of aluminum, for example), the better the heat conduction is to the cold plates (at the expense of lower battery energy density). The thickest thermally conductive insert 30 (e.g., T=0.8 mm) has a maximum temperature of 50.1 C at t=500 seconds, as compared to a maximum temperature of 53.0 C for a thickness T=0 mm (i.e., no thermally conductive insert).

Figure 5:
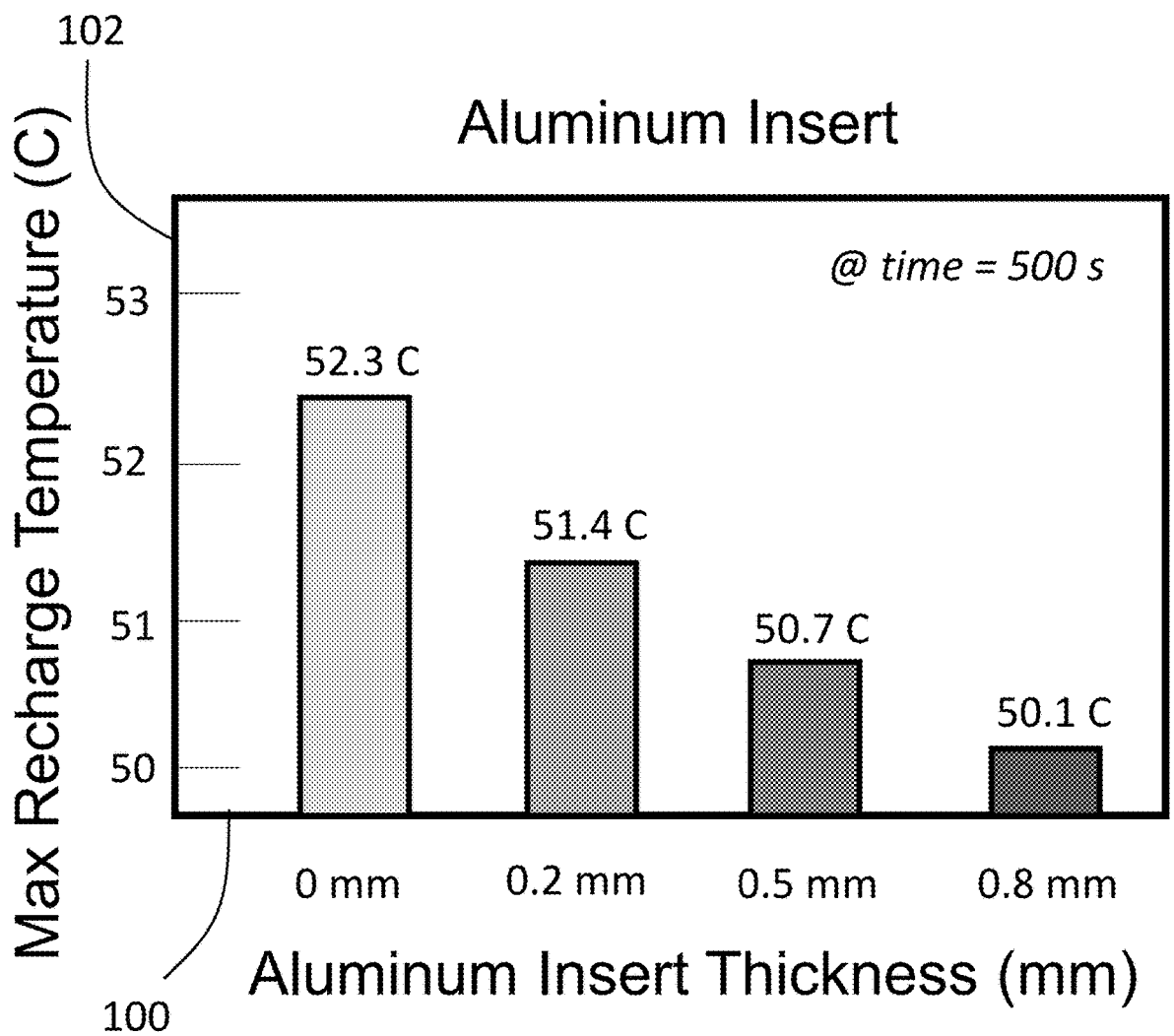
FIG. 5 shows a summary comparison plot of the calculated maximum (e.g., peak) recharge temperatures at the top of the battery cell at time=500 seconds, for the four different designs referred to in FIG. 4, according to the present disclosure.

FIG. 5 shows a summary comparison plot of the calculated maximum (e.g., peak) recharge temperatures at the top of the battery cell 10 at time=500 seconds, for the four different designs of an aluminum thermally conductive insert 30 referred to in FIG. 4, according to the present disclosure. The x-axis is labelled item 100; while the y-axis is labelled item 102. The maximum temperature decreases from 53.0 C to 50.1 C, as the thickness of the thermally conductive insert 30 increases from 0 mm to 0.8 mm. The thickness of the thermally conductive insert 30 can range from 0.2 mm to 1.2 mm. However, the thicker the thermally conductive insert 30 is, the lower the energy density of the battery pack is. So, there is a trade-off between the maximum battery temperature and the energy density of the battery cell 10, depending on which thickness is used for the thermally conductive insert 30.

Figure 6:
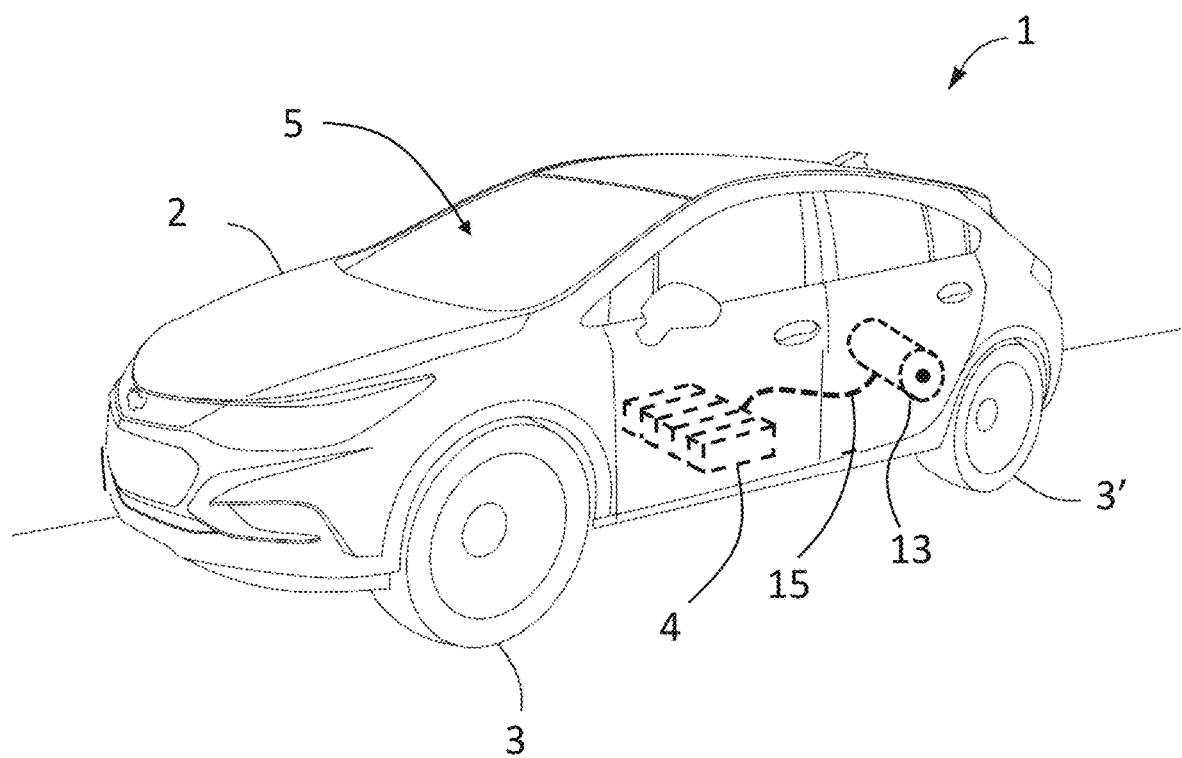
FIG. 6 shows a schematic perspective view of an example of an electric vehicle with a Lithium-ion battery pack, according to the present disclosure.

FIG. 6 shows a schematic perspective view of an example of an electric motor vehicle 1 with a battery pack 4, according to the present disclosure. Electric motor vehicle 1 includes a vehicle body 2, a passenger compartment 5 disposed inside of vehicle body 2, a plurality of road wheels 3, 3', etc. attached to vehicle body 2, and a battery pack 4 located inside of electric motor vehicle 1. Electric motor vehicle 1 further comprises one or more electric traction motors 13 attached to vehicle body 2 that are operable to drive one or more of the road wheels 3, 3', etc. that propels electric motor vehicle 1. The battery pack 4 is physically attached to vehicle body 2 and is electrically connected to the traction motor(s) 13 with electrical cable 15.

Figure 7:
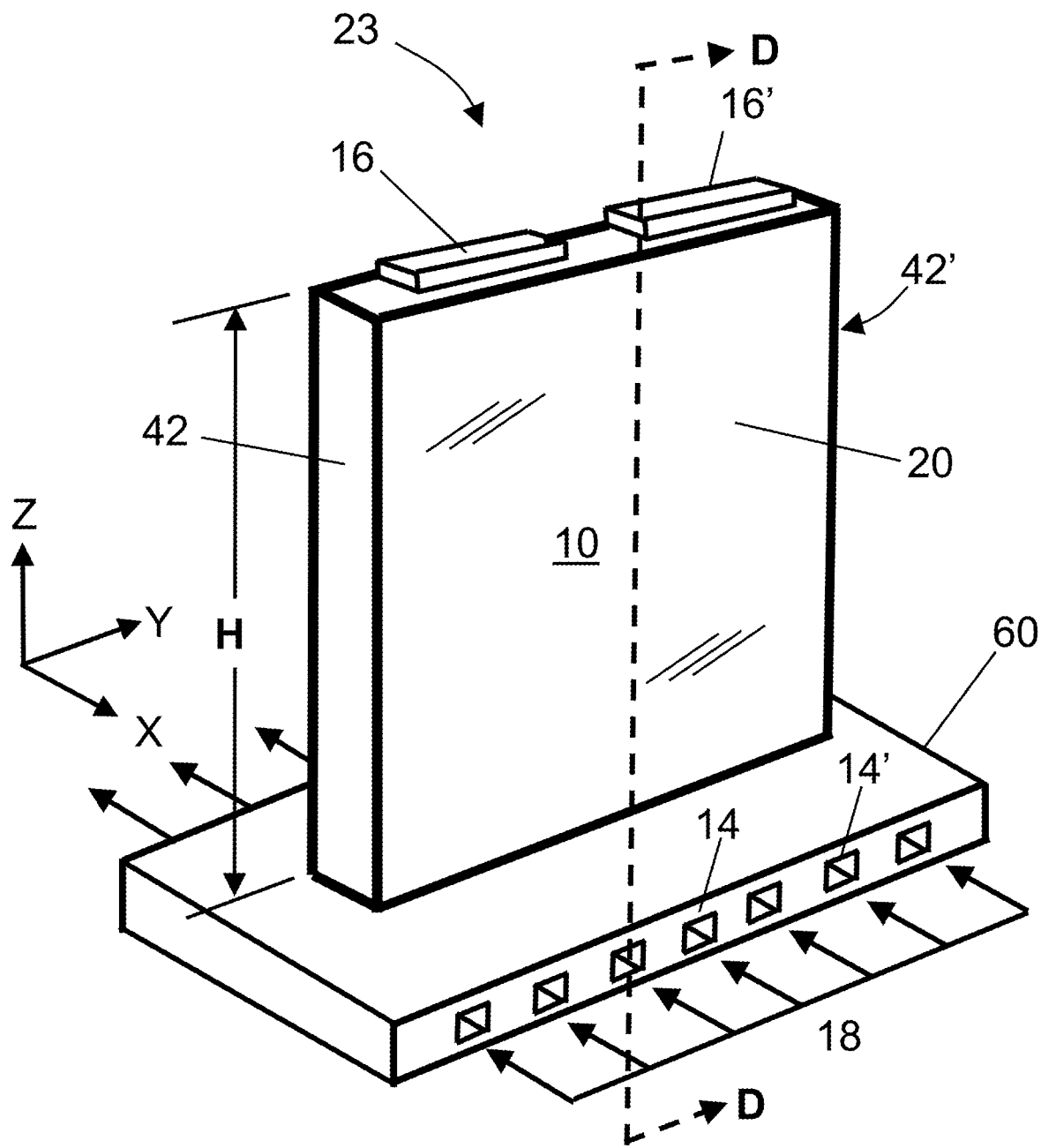
FIG. 7 shows a schematic perspective view of an example of a prismatic battery cell with cooling channels disposed in an actively-cooled bottom cold plate disposed on a bottom end of the battery cell, according to the present disclosure.

FIG. 7 shows a schematic perspective view of an example of a prismatic battery can 23 with cooling channels 14, 14' disposed in an actively-cooled, bottom cold plate 60 that supports battery cell 10, according to the present disclosure. Coolant 18 flows through parallel cooling channels 14, 14', etc. in the X-direction. Side walls 42 and 42' have been identified.

Figure 8A:
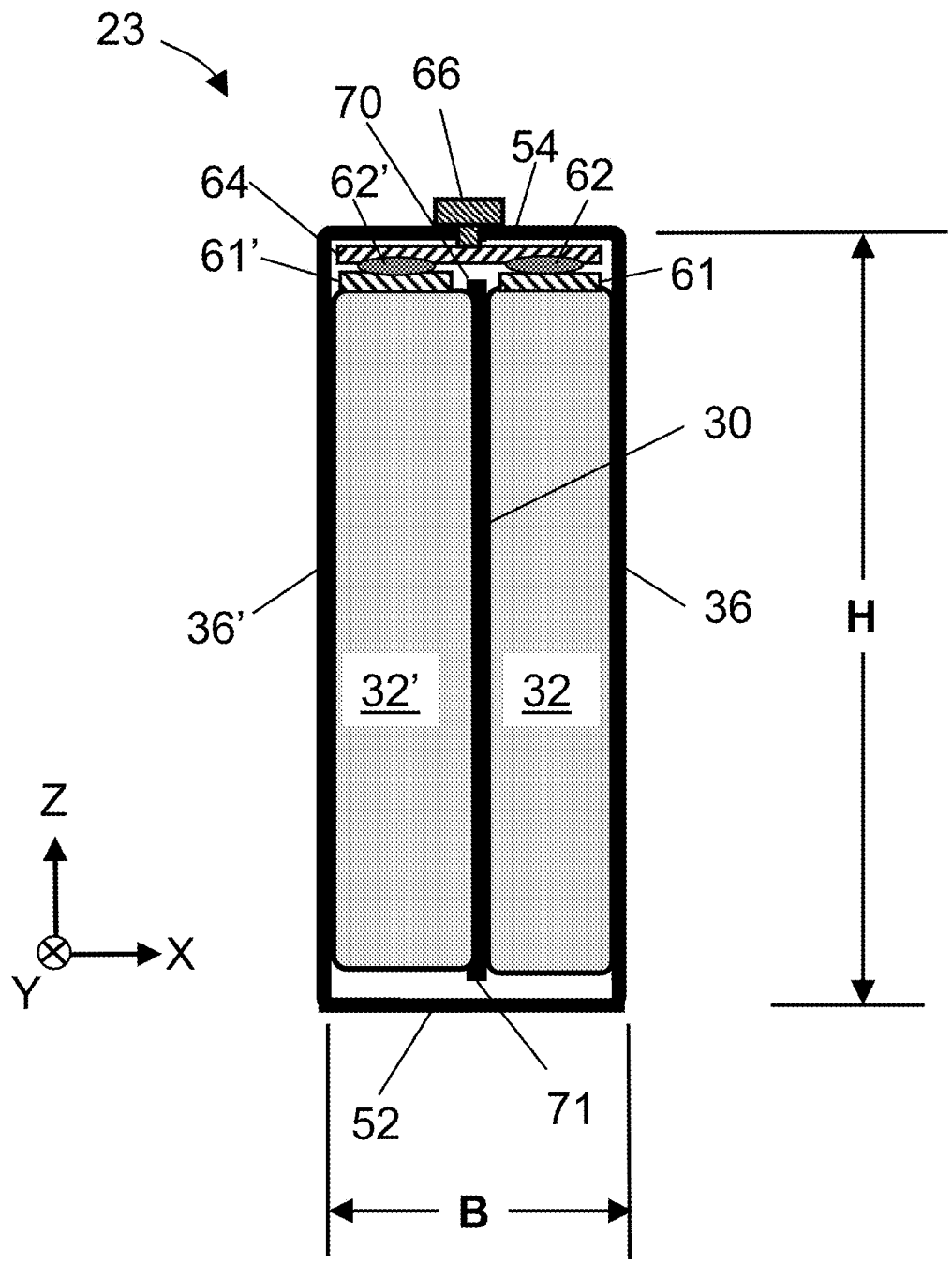
FIG. 8A shows a cross-section view (SECTION B-B) of an example of two, half-sized jelly-roll prismatic battery cells of width=B/2, with side cooling and including a thermally conductive insert, according to the present disclosure.
Figure 13:
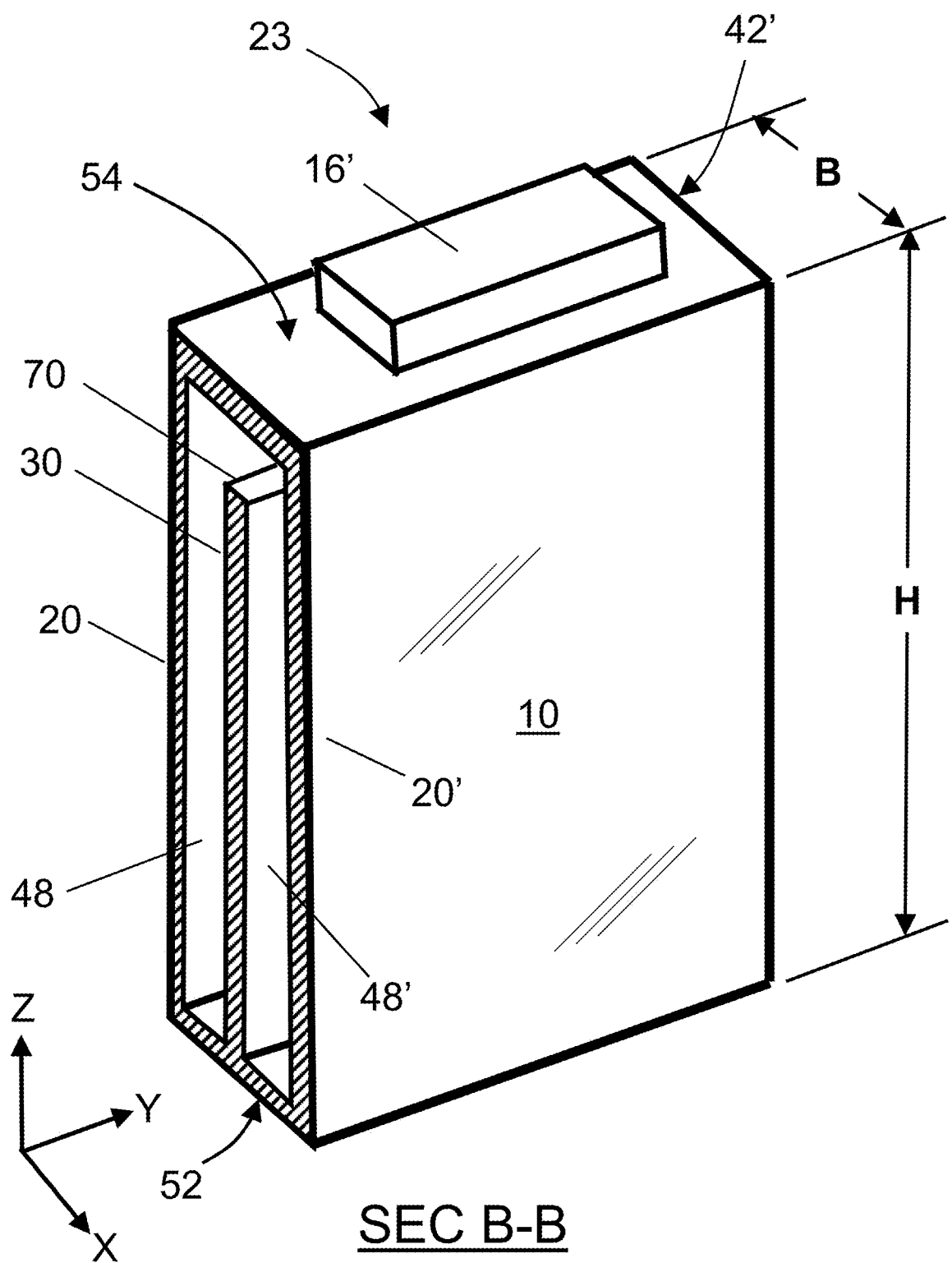
FIG. 13 shows a schematic, perspective, cutaway view (SECTION B-B) of an example of a prismatic battery can with a thermally conductive insert disposed inside of the prismatic battery can, according to the present invention.

FIG. 8A shows a cross-section view (SEC B-B) of an example of two, half-sized jelly-roll prismatic battery cells 32, 32' of width=B/2, with side cooling and including a thermally conductive insert 30, according to the present disclosure. Side cooling (not shown in this view) may be used in this embodiment. The wide plane of thermally conductive insert 30 is oriented parallel to the Y-Z plane. Disposed on top of each battery cell 32 and 32' are electrode tabs 61 and 61', respectively. Horizontal current collector plate 64 spans across both electrode tabs 61 and 61', and collector plate 64 is attached with welds 62 and 62' to electrode tabs 61 and 61', respectively. Disposed at the top of battery can 23 is an electric terminal 66 for making an electric connection to current collector plate 64. Note that FIG. 13 shows a close-up view of the top of battery can 23. Because of the use of electrode tabs 61, 61', welds 62, and current collector plate 64, it is not possible to extend thermally conductive insert 30 all the way to the top of prismatic battery can 23. For this reason, the vertical extent of thermally conductive insert 30 stops just short at location 70 and does not extend all the way to the top surface 54 of prismatic battery can 23.

Referring still to FIG. 8A, in some embodiments, the bottom end 71 of thermally conductive insert 30 optionally does not connect to the lower wall 52 of prismatic battery can 23. In this embodiment, it is sufficient for the thermally conductive insert 30 to connect only to side walls 42 and 42' of prismatic battery can 23 (i.e., when side cooling is used, as shown in FIGS. 1, 7, and 8B).

Figure 8B:
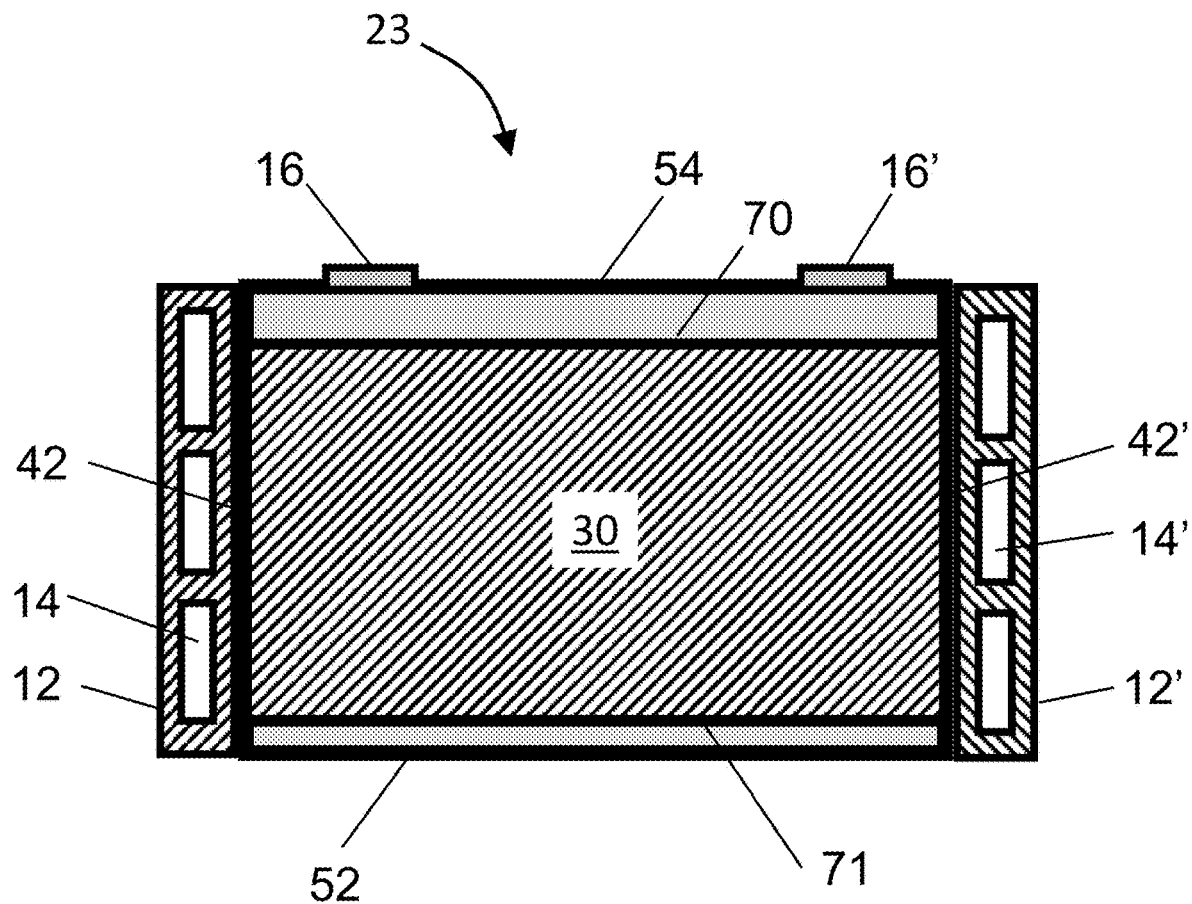
FIG. 8B shows a schematic, elevation cross-section view (SECTION C-C) of an example of a prismatic battery can with a thermally conductive insert and a pair of side cooling manifolds, according to the present disclosure.

FIG. 8B shows a schematic, elevation cross-section view (SECTION C-C) of an example of a prismatic battery can 23 with a thermally conductive insert 30 and side cooling manifolds 12 and 12' and cooling channels 14 and 14, respectively, according to the present disclosure. Thermally conductive insert 30 is attached (e.g., by welding or extrusion) to side walls 42 and 42' of prismatic battery can 30. However, in this embodiment, the upper and lower extents 70 and 71, respectively, of thermally conductive insert 30 are not attached to the upper and lower walls 54 and 52, respectively, of prismatic battery can 23 (i.e., because the upper and lower walls 54 and 52 are not actively-cooled in this embodiment, which uses side cooling).

Figure 8C:
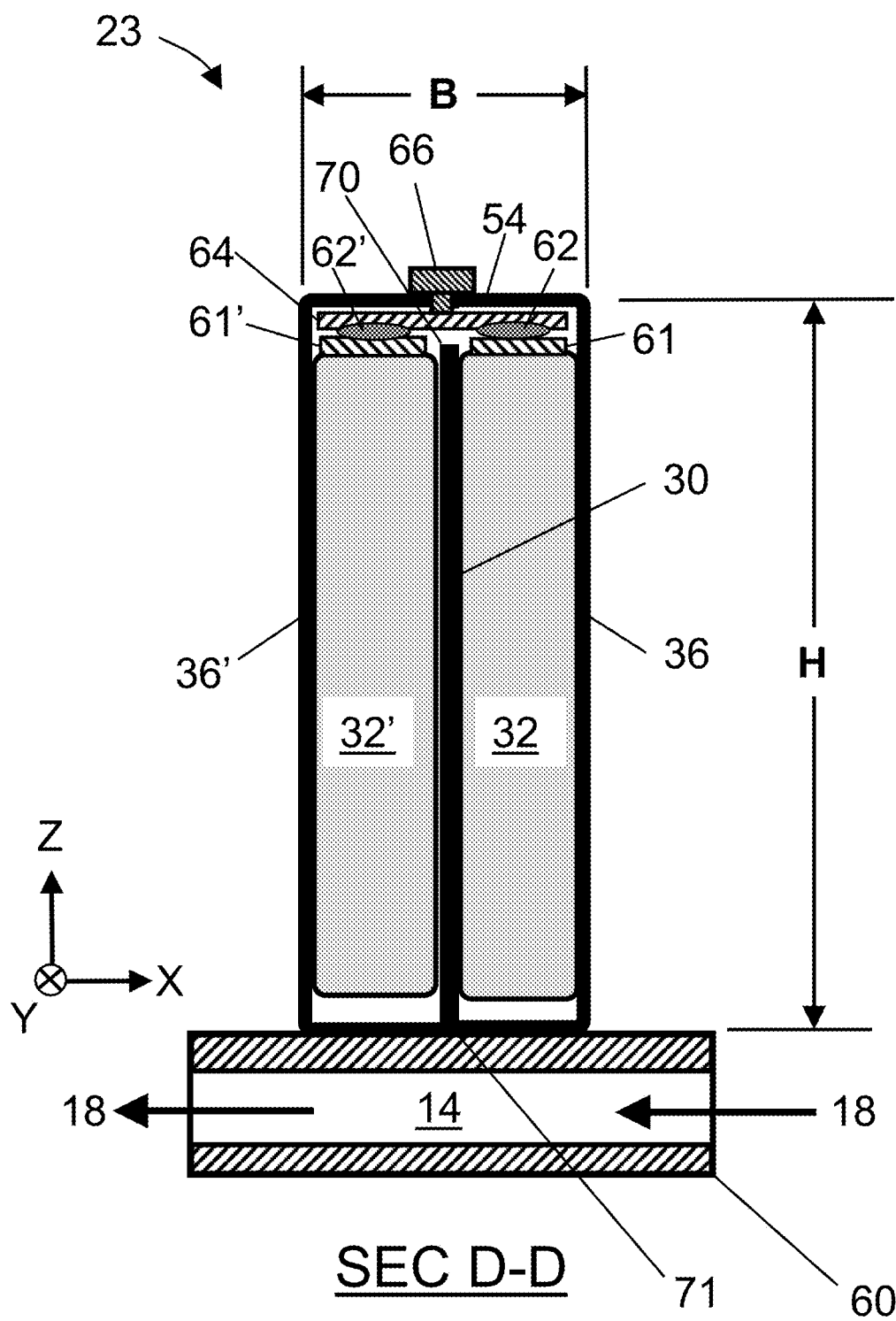
FIG. 8C shows a cross-section view (SECTION D-D) of an example of two, half-sized jelly-roll prismatic battery cells of width=B/2, supported by an actively-cooled bottom plate, and including a thermally conductive insert, according to the present disclosure.

FIG. 8C shows a cross-section view (SECTION D-D) of an example of two, half-sized jelly-roll prismatic battery cells 32, 32' of overall width=B, with a thermally conductive insert 30, disposed inside of battery can walls 36, 36', 42, and 42', according to the present disclosure. Cooling channels 14, 14', etc. are disposed in a thermally-coupled, actively-cooled, bottom cold plate 60 that supports battery can 23. Coolant 18 flows in the X-direction inside of cooling channels 14, 14', etc. The plane of thermally conductive insert 30 is oriented parallel to the Y-Z plane. Disposed on top of each battery cell 32 and 32' are electrode tabs 61 and 61', respectively. Horizontal current collector plate 64 spans across both electrode tabs 61 and 61', and collector plate 64 is attached with welds 62 and 62' to electrode tabs 61 and 61', respectively. Disposed at the top of battery can 23 is an electric terminal 66 for making an electric connection to current collector plate 64. Note that FIG. 13 shows a close-up view of the top of battery can 23. Because of the use of electrode tabs 61, 61', welds 62, and current collector plate 64, it is not possible to extend thermally conductive insert 30 all the way to the top of prismatic battery can 23. For this reason, the vertical extent of thermally conductive insert 30 stops just short at location 70 and doesn't extend all the way to the top surface 54 of prismatic battery can 23.

Figure 9:
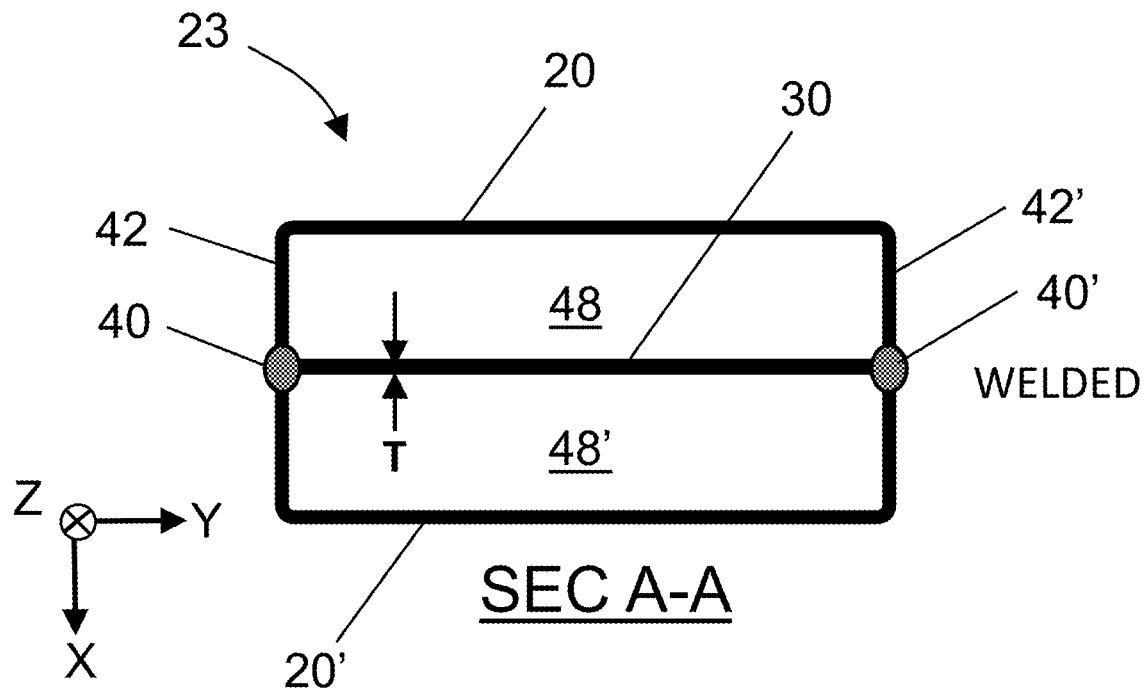
FIG. 9 shows a cross-section view (SECTION A-A) of an example of an empty battery can with a thermally conductive insert that is welded to the battery can with a weld, according to the present disclosure.

FIG. 9 shows a cross-section view (SECTION A-A) of an example of an empty battery can 23 with a thermally conductive insert 30 of thickness=T that is welded to the proximal side 42 and the distal side 42' of battery can 23 with two, line welds 40, 40', respectively, according to the present disclosure. Empty volumes 48, 48' will be filled with a pair of ½-sized battery cells (not shown).

Figure 10:
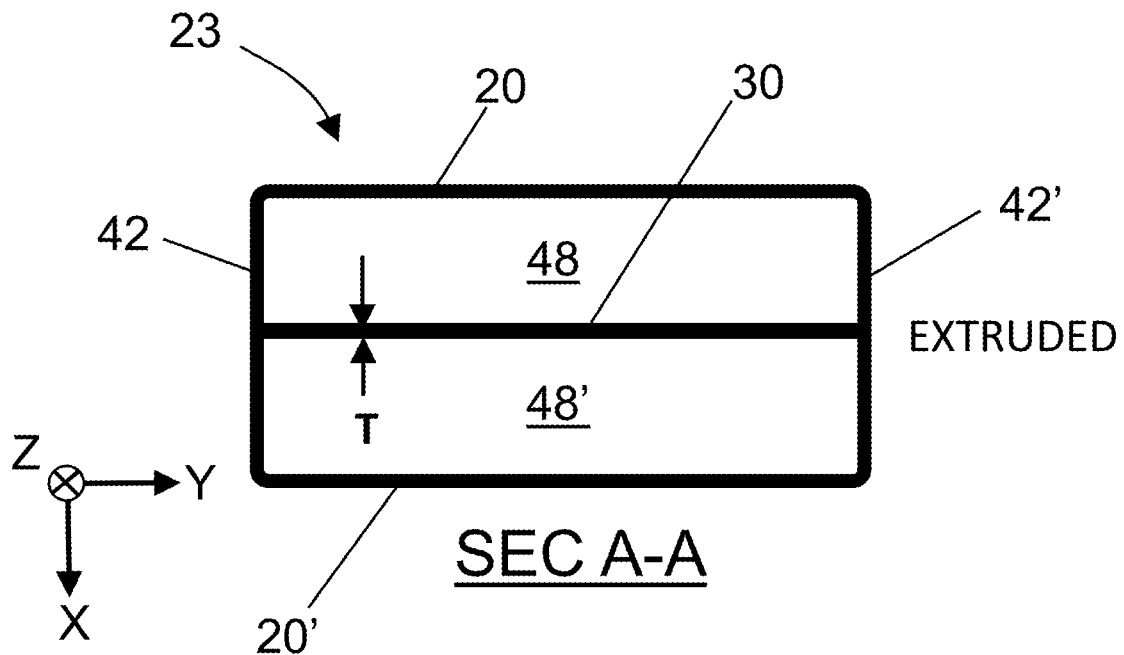
FIG. 10 shows a cross-section view (SECTION A-A) of an example of an empty battery can with a thermally conductive insert that is extruded, according to the present disclosure.

FIG. 10 shows a cross-section view (SECTION A-A) of an example of an empty battery can 23 with proximal and distal end walls 42 and 42', respectively, and with a thermally conductive insert 30 of thickness=T that are all co-extruded as a single, monolithic extrusion, and a pair of side walls 20, 20', according to the present disclosure. Empty volumes 48, 48' are defined by side walls 20 or 20' and end walls 42, 42' and thermally conductive insert 30, and will be eventually filled with a pair of ½-sized battery cells (not shown).

Figure 11:
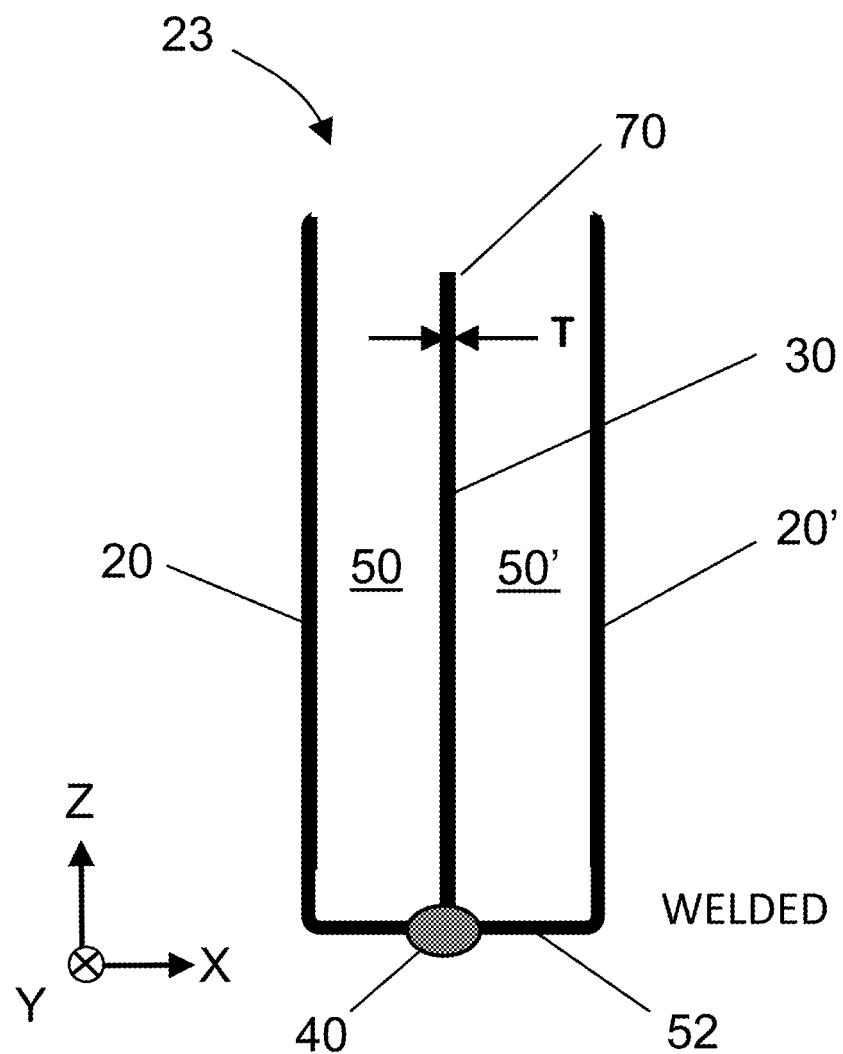
FIG. 11 shows a cross-section view (SECTION D-D) of an example of an empty battery can with a thermally conductive insert that is extruded, according to the present disclosure.

FIG. 11 shows a cross-section view (SECTION D-D) of an example of an empty battery can 23 with a pair of side walls 20, 20', and a thermally conductive insert 30 with a thickness=T that is welded to bottom end 52 of battery can 23 with a weld 40, according to the present disclosure. Empty volumes 50, 50' are defined by side walls 20 or 20' and end walls 42, 42' (not shown) and thermally conductive insert 30, and will be eventually filled with a pair of ½-sized battery cells (not shown). Thermally conductive insert 30 does not extend all the way vertically to the top of prismatic battery can 23, but, rather, stops just short of the top at location 70. This configuration may be used with bottom cooling, as shown in FIG. 7.

Figure 12:
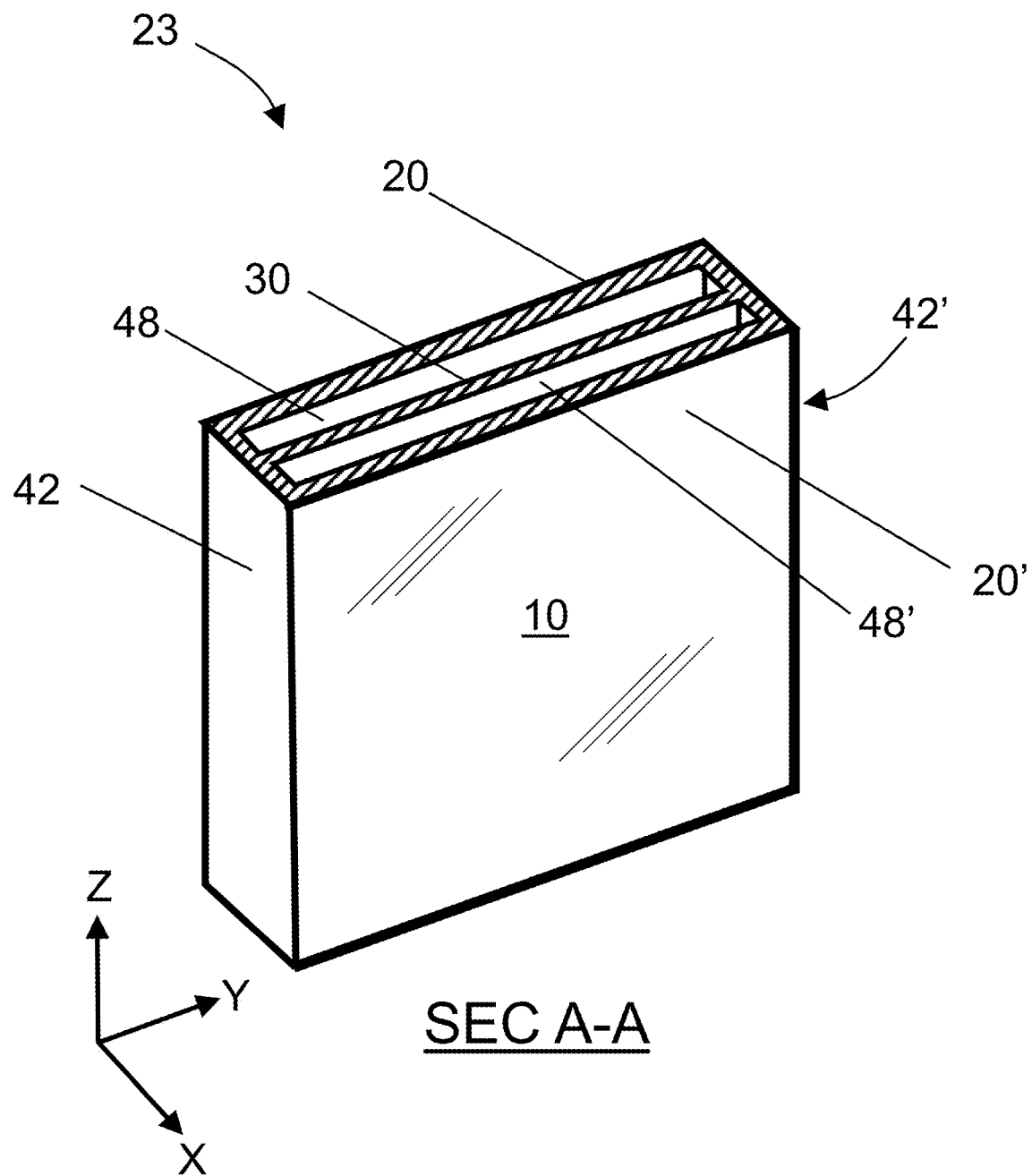
FIG. 12 shows a cross-section, cutaway view (SECTION A-A) of an example of a prismatic battery can with a thermally conductive insert, according to the present disclosure.

FIG. 12 shows a cross-section, cutaway view (SECTION A-A) of an example of an empty battery can 23 with a thermally conductive insert 30, according to the present disclosure. Thermally conductive insert 30 spans across the full width of battery can 23, from proximal side 42 to distal side 42', and the plane of thermally conductive insert 30 is parallel to the Y-Z plane. Empty volumes 48, 48' will eventually be filled with a pair of ½-sized battery cells (not shown). It should be noted, however, in some embodiments, that the wall thickness of external wall 20 or 20' may be the same, or different, than the wall thickness of thermally conductive insert 30.

FIG. 13 shows a schematic, perspective, cutaway view (SECTION B-B) of an example of a prismatic battery can 23 with a thermally conductive insert 30 disposed inside of the prismatic battery can 23, according to the present invention. Thermally conductive insert 30 defines a pair of empty volumes 48 and 48' on either side of insert 30, within prismatic battery can 30. Thermally conductive insert 30 does not extend vertically all the way to the top surface 54 of prismatic battery can 23, but, rather, stops at location 70 (to make room for internal electrical connections to external electrical terminal 16').

Figure 14:
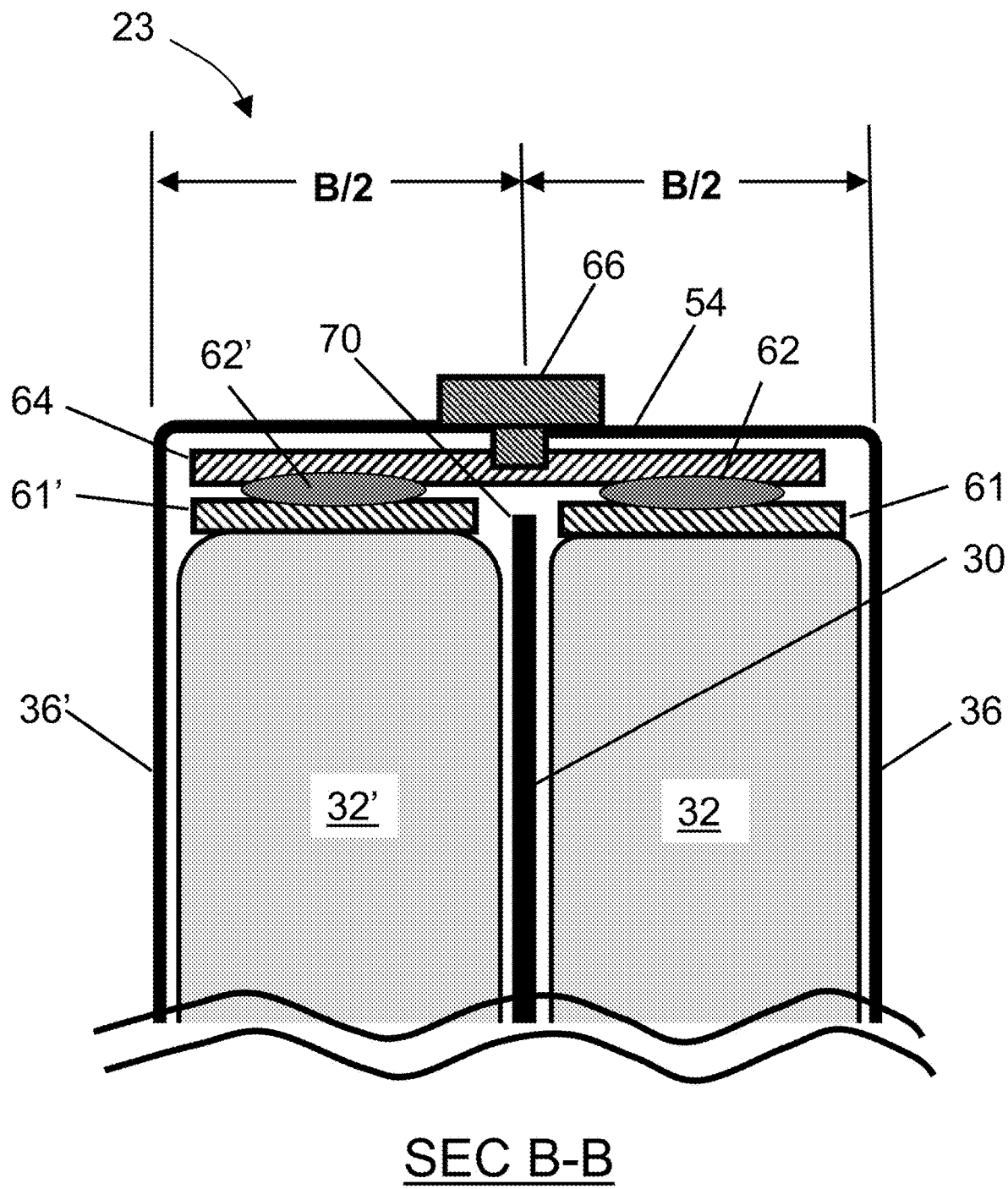
FIG. 14 shows a cross-Section, cutaway view (SECTION B-B) of an example of a prismatic battery can with a thermally conductive insert disposed inside of the prismatic battery can, according to the present disclosure.

FIG. 14 shows a cross-section, cutaway view (SECTION B-B) of an example of a prismatic battery can 23 with a thermally conductive insert 30, according to the present disclosure. Thermally conductive insert 30 spans vertically nearly across the full height, H, of battery can 23, from bottom plate 52 to near the top (i.e. cover) plate 54. The wide plane of thermally conductive insert 30 is parallel to the Y-Z plane. Disposed on top of each battery cell 32 and 32' are electrode tabs 61 and 61', respectively. Horizontal current collector plate 64 spans across both electrode tabs 61 and 61', and current collector plate 64 is attached with welds 62 and 62' to electrode tabs 61 and 61', respectively. Disposed at the top of battery can 23 is an electric terminal 66 for making an electric connection to current collector plate 64. Thermally conductive insert 30 does not extend vertically all the way to the top surface 54 of prismatic battery can 23, but, rather, stops at location 70 (to make room for internal electrical connections to external electrical terminal 16').

Figure 15:
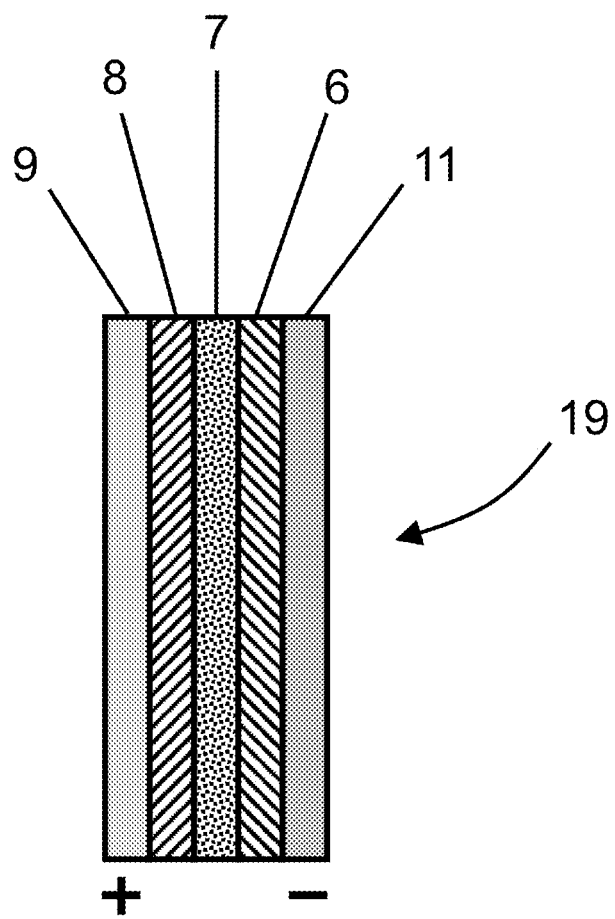
FIG. 15 shows a schematic, cross-section view of an example of five stacked layers of a Lithium-ion battery, according to the present disclosure.

FIG. 15 shows a schematic, cross-section view of an example of five layers of a Lithium-ion battery cell 19, according to the present disclosure. The five battery layers of Lithium-ion battery cell 19 comprise: a negative current collector layer 11, an anode electrode layer 6 disposed adjacent to the negative current collector layer 11, a separator layer 7 disposed adjacent to the anode electrode layer 6, a cathode electrode layer 8 disposed adjacent to the separator layer 7 and opposite the anode electrode layer 6, and a positive current collector layer 9 disposed adjacent to the cathode electrode layer 8. The negative current collector layer 11 can comprise a copper sheet. The anode electrode layer 6 can comprise a material chosen from: graphite, Lithium Titanate, Silicon/Carbon, or Tin/Cobalt alloy, and combinations thereof. The separator layer 7 can comprise a micro-porous polyolefin polymer chosen from: micro-porous polyethylene (PE), micro-porous polypropylene (PP), or micro-porous polyethylene terephthalate (PET), and combinations thereof. The cathode electrode layer 8 can comprise a compound chosen from: lithium-metal-oxides, $LiC_0O_2$ (LCO), $LiMn_2O_4$ (LMO), $LiFePO_4$ (LFP), Nickel-Manganese-Cobalt oxides (NMC), or Nickel-Cobalt-Aluminum Oxide (NCA), and combinations thereof. Finally, in some embodiments, the positive current collector layer 9 can comprise aluminum.

Figure 16:
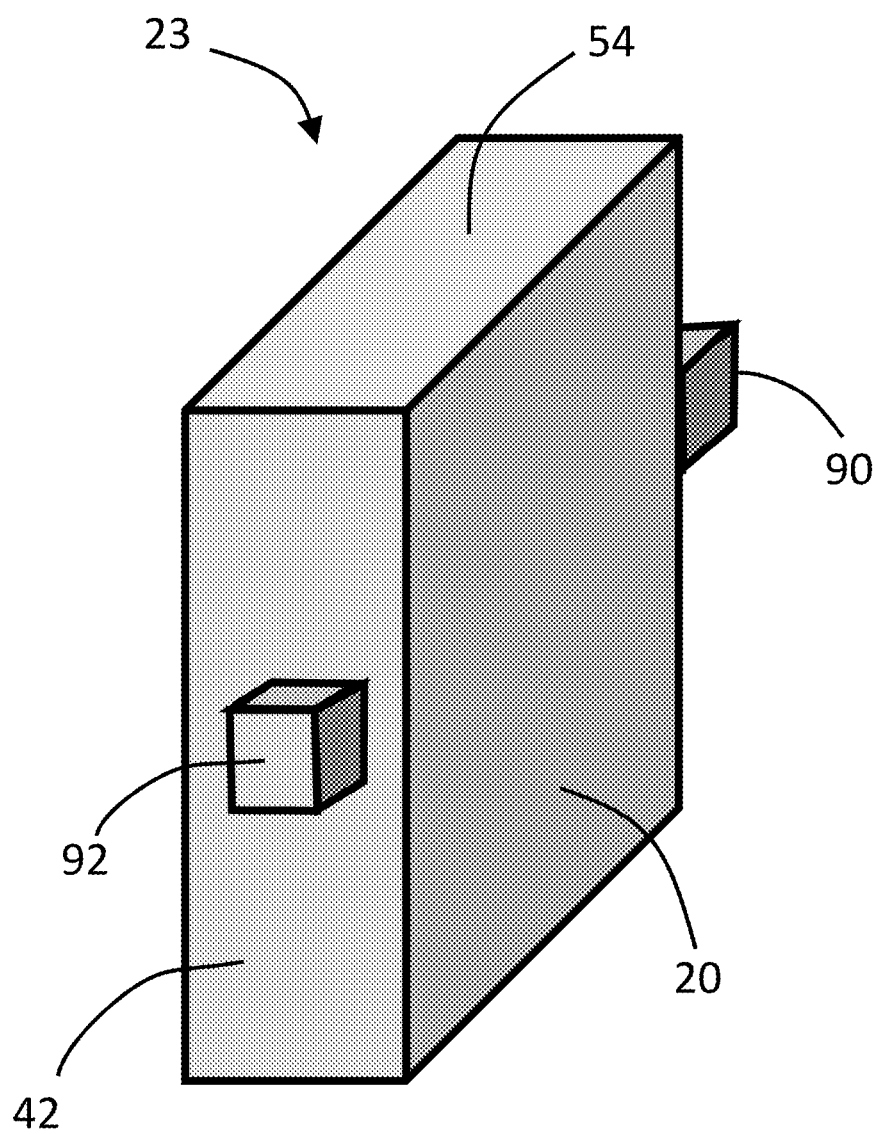
FIG. 16 shows a schematic perspective view of an example of a prismatic battery can with positive and negative electrode tabs on the side walls of the prismatic battery can, according to the present disclosure.

FIG. 16 shows a schematic perspective view of an example of a prismatic battery can 23 with positive and negative electrode tabs 90 and 92 that are disposed on the side walls 20 and 42, respectively of battery can 23, according to the present disclosure. In this embodiment, no electrode tabs are disposed on the upper surface 54 of battery can 23.

In some embodiments, more than one (i.e., multiple) thermally conductive insert(s) 30 may be used inside of each prismatic battery can 23.

Figure 17:
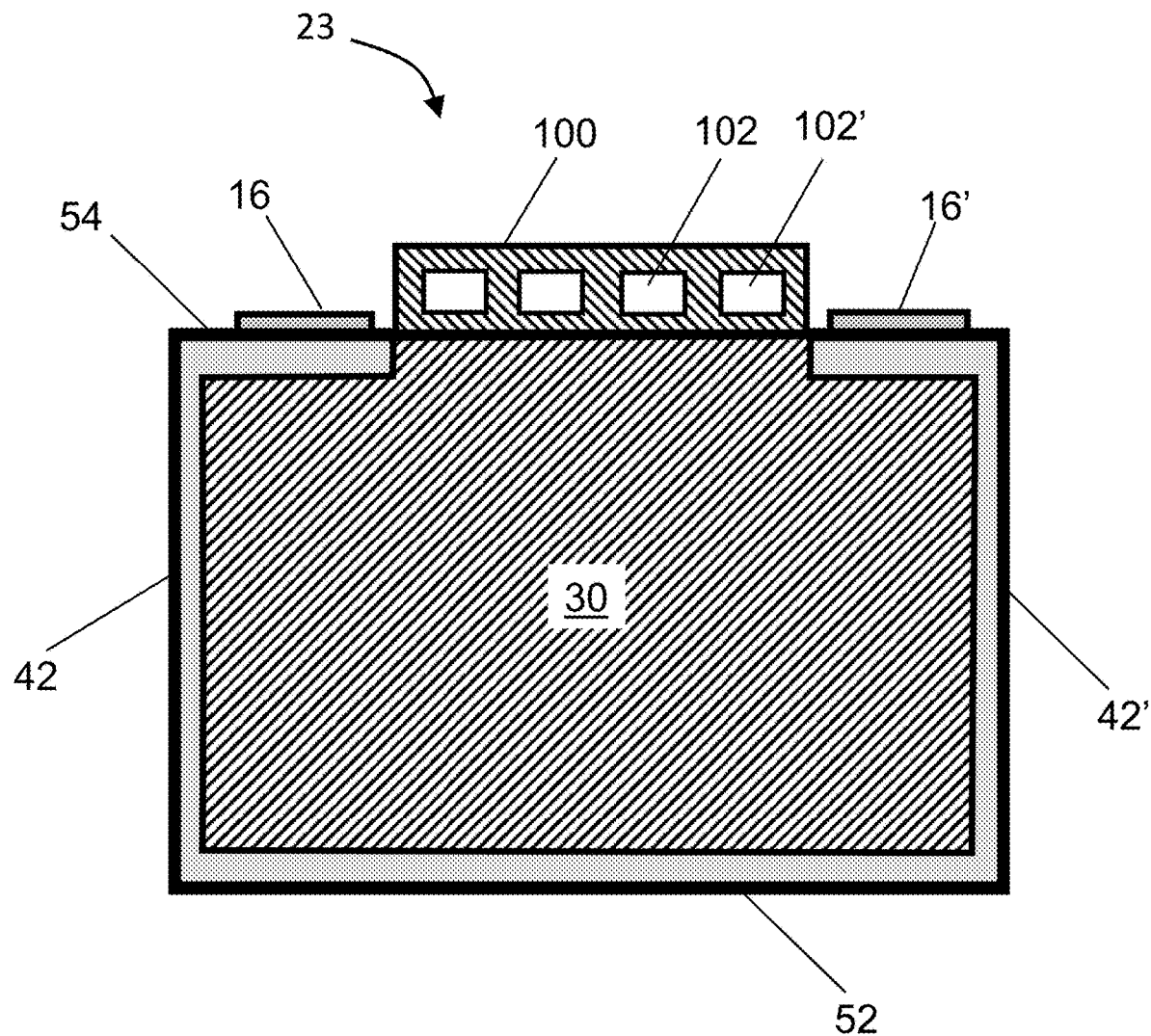
FIG. 17 shows a schematic elevation view of an example of a prismatic battery can with top cooling and a thermally conductive insert, according to the present disclosure.

FIG. 17 shows a schematic elevation view of an example of a prismatic battery can 23 with top cooling and a thermally conductive insert 30, according to the present disclosure. In some embodiments, active-cooling is applied to the top surface 54 of prismatic battery can 23. This top cooling scheme comprises a top coolant manifold 100 with a plurality of cooling channels 102, 102', etc. disposed inside of top coolant manifold 100. In this embodiment, thermally conductive insert 30 is attached (e.g., welded) only to the top surface 54 of prismatic battery can 30, and not to side walls 42, 42' or to bottom surface 52. Optionally, thermally conductive insert 30 may be attached to some of all the walls of prismatic battery can 23.

In some embodiments, the various active-cooling schemes (e.g., side cooling on two sides, bottom cooling, and top cooling) can be combined in a variety of different ways to cool a prismatic battery, including, but not limited to:
1. Side cooling only;
2. Bottom cooling only;
3. Top cooling only;
4. Side and Bottom cooling;
5. Side and Top cooling;
6. Bottom and Top cooling; and
7. Side, Bottom, and Top cooling.

Figure 18:
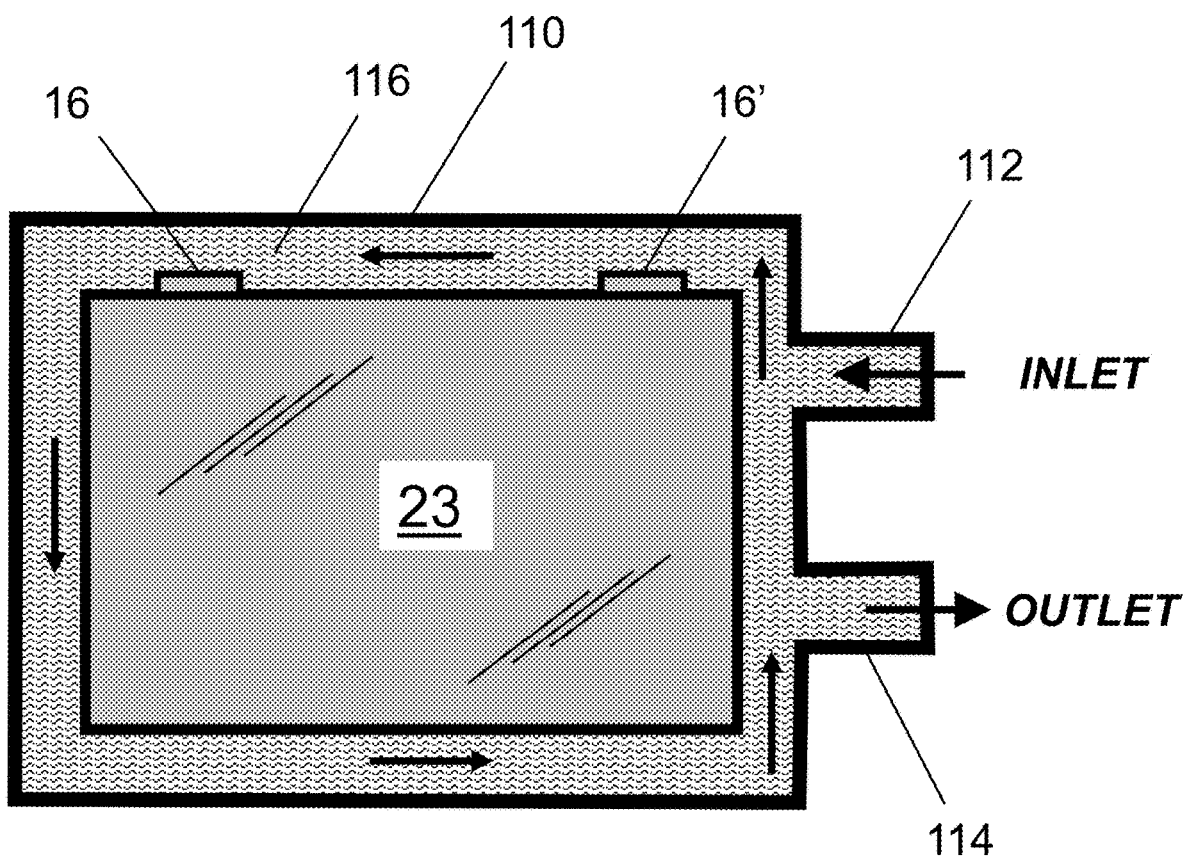
FIG. 18 shows a schematic elevation view of an example of a prismatic battery can with immersion cooling and a thermally conductive insert, according to the present disclosure.

FIG. 18 shows a schematic elevation view of an example of a prismatic battery can 23 that is cooled by immersion cooling, with a thermally conductive insert 30, according to the present disclosure. Immersion cooling is provided by encasing the prismatic battery can within a sealed coolant enclosure 110 that carries coolant fluid 116 (which may be a dielectric cooling fluid, such as: hydrofluoroethers, hydrocarbons, esters, silicon oils, water/glycol mixtures, hydrofluoroethers, or fluorocarbon-based fluids, and combinations thereof) that completely surrounds prismatic battery can 23 and electrode terminals 16 and 16' on all sides with a flowing bath of coolant 116. Coolant fluid inlet 112 and coolant fluid outlet 114 supply and remove flowing coolant 116 into and out of sealed coolant enclosure 110, respectively. For immersion cooling, the thermally conductive insert 30 may be connected to at least one surface of the prismatic battery can 23, and with attachment to more surfaces being better.

Referring still to FIG. 18, in some embodiments coolant 115 is not circulated around prismatic battery can 23. Rather, the prismatic battery can 23 resides in a stationary, non-circulating bath of coolant 116. In this case, there would only be one fill opening (not illustrated) at the top enclosure 110 that is used to fill the enclosure 110 with coolant fluid 116.

What is claimed is:
1. A prismatic battery, comprising:
a prismatic battery can having a top surface, a bottom plate, a vertical Z-direction oriented along a height of the prismatic battery can, and a horizontal Y-direction oriented along a width of the prismatic battery can; and
a thermally conductive insert disposed inside of the prismatic battery can that defines a first volume inside of the prismatic battery can, wherein the first volume is disposed on a first side of the thermally conductive insert, and that defines a second volume inside of the prismatic battery can, the second volume being disposed on a second side of the thermally conductive insert;
wherein the thermally conductive insert is attached to the bottom plate of the prismatic battery can; and
wherein the thermally conductive insert does not extend vertically in the vertical Z-direction all the way to the top surface of the prismatic battery can.
2. The prismatic battery of claim 1, wherein the thermally conductive insert is made of a thermally conductive metal chosen from aluminum, aluminum alloy, copper, or copper alloy, or combinations thereof.
3. The prismatic battery of claim 1, further comprising:
a first set of battery layers disposed inside of the first volume in the prismatic battery can; and
a second set of battery layers disposed inside of the second volume in the prismatic battery can.
4. The prismatic battery of claim 3, wherein the first set of battery layers and the second set of battery layers comprise Lithium-ion battery layers.
5. The prismatic battery of claim 3,
wherein the first set of battery layers is wound in a jelly-roll geometry; and
wherein the second set of battery layers is wound in a jelly-roll geometry.
6. The prismatic battery of claim 1, wherein the thermally conductive insert has a thickness that ranges from 0.2 mm to 1.2 mm.
7. The prismatic battery of claim 1, wherein the prismatic battery can comprises a pair of outer can walls that are oriented parallel to a plane of the thermally conductive insert.
8. The prismatic battery of claim 1, wherein the thermally conductive insert is welded to the prismatic battery can.
9. The prismatic battery of claim 7, wherein the thermally conductive insert is integral and monolithic with the pair of outer can walls.
10. The prismatic battery of claim 3, wherein the first set of battery layers comprises five layers, comprising:
a negative current collector layer;
an anode electrode layer disposed adjacent to the negative current collector layer;
a separator layer disposed adjacent to the anode electrode layer;
a cathode electrode layer disposed adjacent to the separator layer and opposite the anode electrode layer; and
a positive current collector layer disposed adjacent to the cathode electrode layer.
11. The prismatic battery of claim 3, further comprising:
a first electrode tab disposed on a top surface of the first set of battery layers;
a second electrode tab disposed on a top surface of the second set of battery layers;
a current collector plate bridging across, and electrically connected to, the first and second electrode tabs; and an electrical terminal disposed on a top surface of the current collector plate;
wherein the current collector plate is welded to the first electrode tab;
wherein the current collector plate is welded to the second electrode tab;
wherein the electrical terminal is attached to, and electrically connected to, the current collector plate; and
wherein the thermally conductive insert does not extend vertically in the Z-direction above the current collector plate.

12. The prismatic battery of claim 10,
wherein the prismatic battery comprises a Lithium-ion battery;
wherein the negative current collector layer comprises copper;
wherein the anode electrode layer is chosen from: graphite, Lithium Titanate, Silicon/Carbon, or Tin/Cobalt alloy, or combinations thereof;
wherein the separator layer is a micro-porous polyolefin polymer chosen from: micro-porous polyethylene (PE), micro-porous polypropylene (PP), or micro-porous polyethylene terephthalate (PET), or combinations thereof;
wherein the cathode electrode layer is chosen from: lithium-metal-oxides, $LiCoO_2$ (LCO), $LiMn_2O_4$ (LMO), $LiFePO_4$ (LFP), Nickel-Manganese-Cobalt oxides (NMC), or Nickel-Cobalt-Aluminum Oxide (NCA), Or combinations thereof; and
wherein the positive current collector layer comprises aluminum.

13. The prismatic battery of claim 1, wherein the prismatic battery further comprises:
a first cooling manifold, with a first plurality of cooling channels, that is thermally coupled to a first vertical side of the prismatic battery can; and
a second cooling manifold, with a second plurality of cooling channels, that is thermally coupled to an opposing, second vertical side of the prismatic battery can.

14. The prismatic battery of claim 1, wherein the prismatic battery further comprises an actively-cooled, bottom cold plate disposed underneath the prismatic battery can.

15. The prismatic battery of claim 1, further comprising:
a first side of the prismatic battery can; and
a second side of the prismatic battery can;
a first electrode tab disposed on the first side of the prismatic battery can; and
a second electrode tab disposed on the second side of the prismatic battery can;
wherein the first side of the prismatic battery can is different than the second side of the prismatic battery can; and
wherein no electrode tabs are disposed on the top surface of the prismatic battery can.

16. An electric motor vehicle, comprising:
a vehicle body with a passenger compartment;
a plurality of road wheels attached to the vehicle body;
a traction motor attached to the vehicle body and operable to drive one or more of the plurality of road wheels to thereby propel the electric motor vehicle; and
a traction battery pack attached to the vehicle body and electrically connected to the traction motor;
wherein the traction battery pack comprises a plurality of prismatic battery cells arranged in mutually parallel rows;
wherein the plurality of prismatic battery cells comprises:
a prismatic battery can, comprising a top surface and a bottom plate;
a thermally conductive insert disposed inside of the prismatic battery can, which defines:
a first volume disposed inside of the prismatic battery can that is disposed on a first side of the thermally conductive insert, and
a second volume disposed inside of the prismatic battery can that is disposed on a second side of the thermally conductive insert;
a first set of Lithium-ion battery layers that is disposed inside of the first volume in the prismatic battery can; and
a second set of Lithium-ion battery layers that is disposed inside of the second volume in the prismatic battery can;
wherein the thermally conductive insert is attached to the bottom plate of the prismatic battery can; and
wherein the thermally conductive insert does not extend vertically in the vertical Z-direction all the way to the top surface of the prismatic battery can.

17. The electric motor vehicle of claim 16, wherein the thermally conductive insert comprises a thermally conductive metal chosen from aluminum, aluminum alloy, copper, or copper alloy, or combinations thereof.

18. The electric motor vehicle of claim 16, further comprising:
a top cooling manifold with a plurality of cooling channels, wherein the top cooling manifold is thermally-coupled to the top surface of the prismatic battery can.

19. The electric motor vehicle of claim 16, further comprising:
a sealed cooling enclosure with a coolant fluid inlet and a coolant fluid outlet;
wherein the prismatic battery can is disposed entirely within the sealed cooling enclosure, and
wherein the prismatic battery can is cooled by immersion cooling.

* * * * *